(12) United States Patent
Wang et al.

(10) Patent No.: US 12,345,845 B2
(45) Date of Patent: Jul. 1, 2025

(54) FLUID PHASE DISCRIMINATION AND ACOUSTIC VELOCITY ESTIMATION BY MEASURING GUIDED-WAVE SPEED

(71) Applicant: Halliburton Energy Services, Inc., Houston, TX (US)

(72) Inventors: Yadong Wang, Singapore (SG); Jichun Sun, Singapore (SG); Ruijia Wang, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 260 days.

(21) Appl. No.: 17/889,342

(22) Filed: Aug. 16, 2022

(65) Prior Publication Data

US 2023/0314648 A1  Oct. 5, 2023

Related U.S. Application Data

(60) Provisional application No. 63/325,245, filed on Mar. 30, 2022.

(51) Int. Cl.
| | |
|---|---|
| *G01V 1/50* | (2006.01) |
| *E21B 47/107* | (2012.01) |
| *G01V 1/18* | (2006.01) |
| *G01V 1/46* | (2006.01) |
| *G01V 1/48* | (2006.01) |

(52) U.S. Cl.
CPC .............. *G01V 1/50* (2013.01); *E21B 47/107* (2020.05); *G01V 1/186* (2013.01); *G01V 1/46* (2013.01); *G01V 2210/123* (2013.01)

(58) Field of Classification Search
CPC .. E21B 47/107; G01V 2210/123; G01V 1/50; G01V 1/186; G01V 1/46
See application file for complete search history.

(56) References Cited

U.S. PATENT DOCUMENTS

| | | | |
|---|---|---|---|
| 2015/0322782 A1* | 11/2015 | Khajeh | E21B 49/08 175/48 |
| 2017/0016312 A1 | 1/2017 | Clarke et al. | |
| 2017/0138178 A1 | 5/2017 | Shampine et al. | |

(Continued)

OTHER PUBLICATIONS

Yao Ge, Ruijia Wang, Yi Yang Ang, Philip Tracadas, Xiang Wu, and Amit Padhi. "Enhanced Wellbore Leak Localization with the Estimation and Removal of Guided Wave Noise Using Array Hydrophone Logging Data." Paper presented at the SPE Annual Technical Conference and Exhibition, Virtual, Oct. 2020.

(Continued)

*Primary Examiner* — Krystine E Breier
(74) *Attorney, Agent, or Firm* — John Wustenberg; C. Tumey Law Group PLLC

(57) ABSTRACT

A method for identifying guided waves in a measurement set. The method may comprise disposing an acoustic logging tool into a wellbore, performing a measurement operation with the acoustic logging too in the wellbore to form a data set which comprises one or more guided waves, measuring a speed of the one or more guided waves, and identifying a fluid phase interface using the speed of the one or more guided waves. The method may further comprise estimating an acoustic velocity of a wellbore fluid using a database and interpreting the fluid phase based at least in part on the acoustic velocity of the wellbore fluid.

10 Claims, 7 Drawing Sheets

(56) References Cited

U.S. PATENT DOCUMENTS

| | | |
|---|---|---|
| 2018/0372902 A1 | 12/2018 | Han et al. |
| 2019/0196041 A1 | 6/2019 | Yao et al. |
| 2019/0317238 A1 | 10/2019 | Wang et al. |
| 2020/0072036 A1 | 3/2020 | Wang |
| 2020/0341163 A1 | 10/2020 | Wang et al. |
| 2021/0103069 A1 | 4/2021 | Jin et al. |
| 2021/0109243 A1 | 4/2021 | Ge et al. |
| 2021/0208299 A1 | 7/2021 | Wang et al. |
| 2021/0222551 A1 | 7/2021 | Jin et al. |
| 2021/0286099 A1 | 9/2021 | Wang et al. |
| 2021/0325558 A1 | 10/2021 | Wang et al. |
| 2021/0333428 A1 | 10/2021 | Wang et al. |
| 2021/0396126 A1 | 12/2021 | Wang et al. |
| 2021/0396900 A1 | 12/2021 | Wang et al. |
| 2021/0396901 A1 | 12/2021 | Zhao et al. |
| 2021/0405232 A1 | 12/2021 | LeBlanc et al. |
| 2022/0136385 A1 | 5/2022 | Wang et al. |
| 2022/0146702 A1* | 5/2022 | Lemarenko ............. G01V 1/52 |
| 2022/0179118 A1 | 6/2022 | Wang et al. |
| 2022/0214468 A1 | 7/2022 | Ellmauthaler et al. |
| 2022/0260530 A1* | 8/2022 | Al-Huwaider ............ G01F 1/74 |

OTHER PUBLICATIONS

Yao Ge, Yadong Wang, Xiang Wu, Ruijia Wang, and Freeman Hill. "Enhancing Wellbore Leak Localization with Continuous Logging Data from a Sonic Sensor Array." Paper presented at the SPWLA 62nd Annual Logging Symposium, Virtual Event, May 2021.

Shihong Chi and Xiaoming Tang, 2006, Stoneley-wave speed modeling in general anisotropic formations, Geophysics 71: F67-F77.

International Search Report and Written Opinion for PCT/US2022/042525 dated Dec. 28, 2022.

White, J.E. and Tongtaow, C., 1981. Cylindrical waves in transversely isotropic media, J. acoust. Soc. Am., 70, 1147-1155.

* cited by examiner

FLUID PHASE DISCRIMINATION AND ACOUSTIC VELOCITY ESTIMATION BY MEASURING GUIDED-WAVE SPEED

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

A growing concern in the life of an oil or gas well is the pressure buildup in its annuli. The first challenge for a petroleum engineer is to identify the source of the leak to enable design of an effective remedial activity. Identification of the source of pressure communication between well tubing-casing and casing-casing annuli presents an enormous challenge to petroleum engineers. Generally, direct waves that propagate directly from a noise source (i.e., a leak) to one or more hydrophones are recorded. Additionally, guided-wave noise that propagates along the borehole that is not from the noise source is also recorded by the hydrophones. The guide-wave noise may be generated by distance leaks, the friction between logging equipment and wellbore inner surface, vibration from surface production facilities, etc. Traditionally, the guided waves are considered only as contaminations to the direct waves, and researchers focused on removing them from the acoustic data.

BRIEF DESCRIPTION OF THE DRAWINGS

These drawings illustrate certain aspects of some examples of the present disclosure and should not be used to limit or define the disclosure.

DETAILED DESCRIPTION

Figure 1:
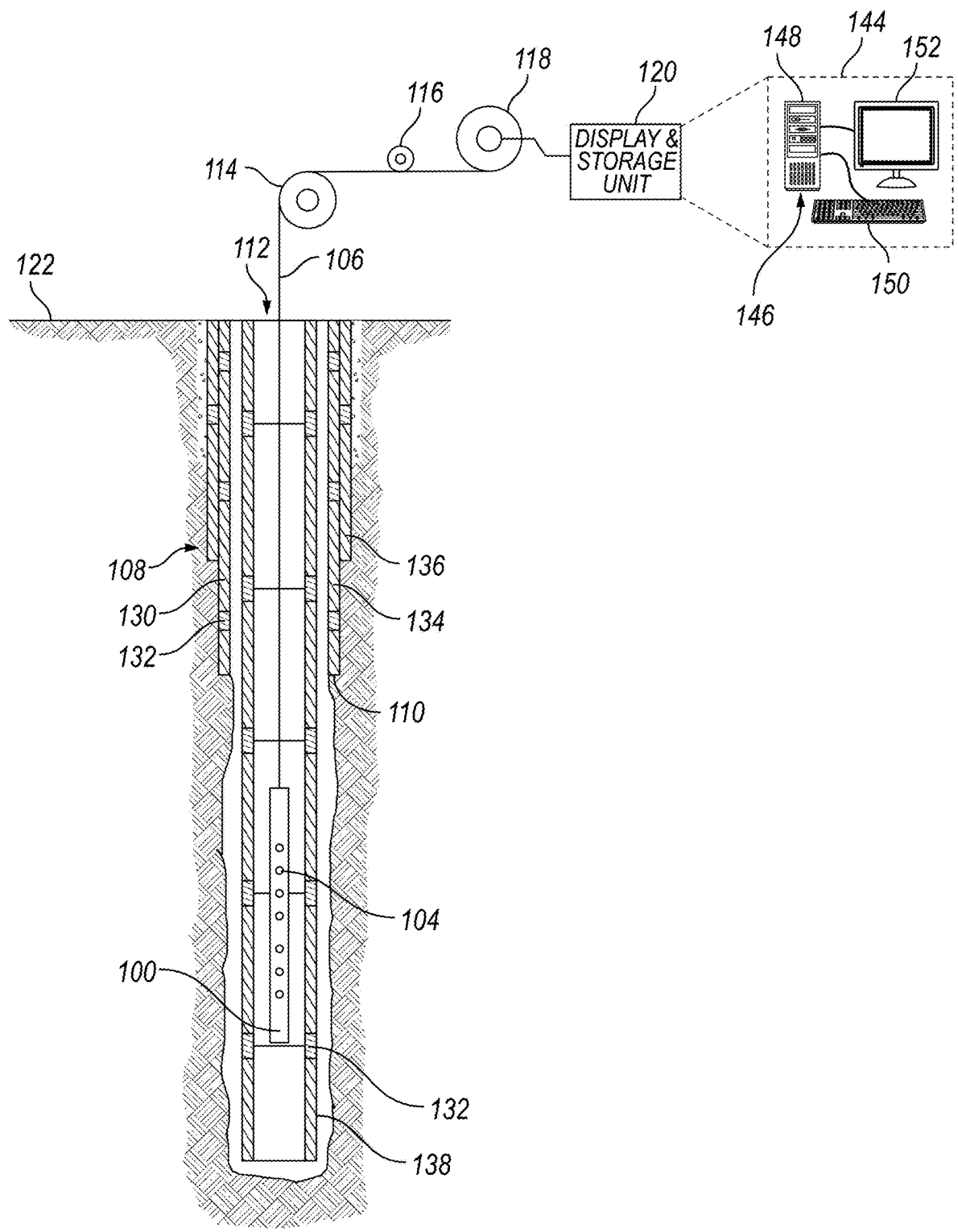
FIG. 1 illustrates a system including an acoustic logging tool.

This disclosure may generally relate to methods for identifying guided waves from a measurement operation without removing them from a measurement set. As discussed below, the guided-wave speed may be measured using an acoustic logging tool with two or more hydrophones that are separated along the axis of the acoustic logging tool. The guided-wave speed is related to the acoustic velocity of a fluid within the wellbore. As the acoustic velocities of typical oil, gas, and water differ from each other, the guided-wave speeds are also different. Therefore, the wellbore fluid phase may be discerned by measuring guided-wave speed FIG. 1 illustrates an operating environment for an acoustic logging tool 100 as disclosed herein in accordance with particular embodiments. Acoustic logging tool 100 may comprise a hydrophone 104. In examples, there may be any number of hydrophones 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

As illustrated, one or more hydrophones 104 may be positioned on the acoustic logging tool 100. It should be understood that the configuration of acoustic logging tool 100 shown on FIG. 1 is merely illustrative and other configurations of acoustic logging tool 100 may be used with the present techniques. Hydrophone 104 may include any suitable acoustic receiver suitable for use downhole, including piezoelectric elements that may convert acoustic waves into an electric signal or hydrophones. Additionally, hydrophone 104 may be able to record any waves generated by leakage or other flow event inside and/or outside of the borehole. In examples, hydrophone 104 may be disposed at any suitable location on acoustic logging tool 100. For example, hydrophones 104 may be disposed along the outer edge of acoustic logging tool 100 or within acoustic logging tool 100. Additionally, hydrophones 104 may be stacked along the longitudinal axis of acoustic logging tool 100 and/or one or more hydrophones 104 may be disposed circumferentially in a plane perpendicular to the longitudinal axis of acoustic logging tool 100.

Referring back to FIG. 1, the recordation of signals by hydrophones 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output devices) 152 provide a user interface that enables an operator to interact with acoustic logging tool 100 and/or software executed by processing unit 146. For example, information handling, system 144 may enable an operator to select analysis options, view collected log data, view analysis results, and/or perform other tasks.

Figure 2:
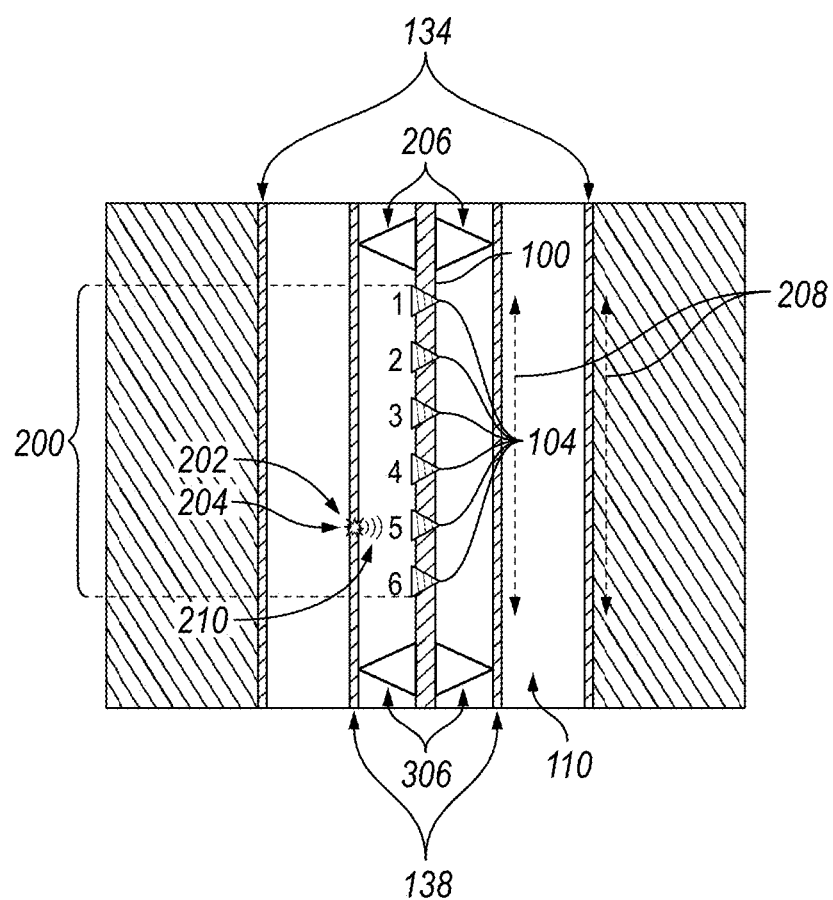
FIG. 2 illustrates an acoustic logging tool during measurement operations.

FIG. 2 illustrates acoustic logging tool 100 with a hydrophone array 200 in accordance with particular embodiments. Without limitation, there may be any number of hydrophones 104. As illustrated, the hydrophone array 200 includes a plurality of the hydrophones 104 arranged longitudinally along the acoustic logging tool 100. During measurement operations acoustic logging tool 100 may detect the depth and radial location of leak 202 and/or flow of fluid 204 in wellbore 110. In examples, acoustic logging tool 100 may be deployed with one or more stabilizers 206 installed above or below acoustic logging tool 100. As illustrated in FIG. 2, and discussed above, acoustic logging tool 100 may be disposed in pipe string 138, which may be disposed in a first casing 134. During operations, each hydrophone 104 of hydrophone array 200 may sense and record any number of acoustic signals and/or vibrations continuously as acoustic logging tool 100 moves up or down wellbore 110 within pipe string 138. The recorded acoustic signals and/or vibrations may be identified as acoustic data. The acoustic data may be transmitted to information handling system 144, which may process each recorded acoustic signal with a beamforming algorithm to identify the location of the acoustic source. In examples, the acoustic source may be a leak 202 caused by flow of fluid 204 in leak 202. Fluid 204 may be flowing from outside pipe string 138 and into pipe string 138, or vice versa. Likewise, fluid 204 may be moving from outside of first casing 134 and into first casing 134, or vice versa. This is true for any casing that may be outside of first casing 134. To properly process acoustic noise beamforming may be used. Beamforming is a signal processing technique used in hydrophone array 200 for directional signal transmission or reception. This is achieved by combining waveforms by a phased array in such a way that signals at particular angles experience constructive interference while others experience destructive interference.

For example, during logging operations, acoustic signals recorded by one or more hydrophones 104 may include guided-wave noise 208. Guided wave noise 208 is defined as borehole acoustic waves propagating along pipe string 138 or first casing 134. In examples, guided-wave noise 208 may propagate up or down any casing. Guided wave noise 208 may be induced by the logging operation, discussed below, by stabilizer 206 or from naturally occurring phenomenon. Additionally, guided wave noise 208 may combine with an acoustic signal generated from the flow of fluid 204 through a leak 202. Described below are methods that remove guided wave noise 208 from measurements to determine the acoustic signal generated from leak 202. This may allow for locating leak 202 within wellbore 110. Guided wave noise 208 may propagate for any distance up and/or down pipe string 138 and/or first casing 134 and contaminate a direct arriving leak signal 210, which may be used for downhole leakage localization. When the noise amplitude from guided wave noise 208 is greater than an amplitude of leak signal 210, the beamforming algorithm result may show a false positive for a leak 202 at a measurement location. Additionally, a higher amplitude from guided wave noise 208 may drown out (i.e., mask) the amplitude of leak signal 210 from leak 202, which may make leak signal 210 hard to identify.

In examples, guided-wave noise 208 may be generated from equipment disposed or connected to acoustic logging tool 100 that may come into contact with pipe string 138 and/or first casing 134, which may emit a noise that may be referred to as road noise. For example, stabilizers 206 may operate and function to center acoustic logging tool 100 within pipe string 138. Stabilizers 206 perform this function by exerting a force on the inside surface of pipe string 138. This force may cause stabilizers 206 to strike the inside of surface of pipe string 138 in a manner that creates noise. The vibration of this noise may travel up and down pipe string 138 as guided wave noise 208. To identify and remove guided wave noise 208, the speed of guided-wave noise 208 may first be measured.

The speed of guided-wave noise 208 may be measured using an acoustic logging tool 100 with two or more hydrophones 104 that may be disposed along the axis of acoustic logging tool 100. The speed of guided-wave noise 208 may be related to the acoustic velocity of fluid within wellbore 110. As acoustic velocities of typical oil, gas, and water differ from each other, the speeds of guided-wave noise 208 for oil, gas, and water may also different. Therefore, wellbore fluid phase may be discerned by measuring guided-wave speed.

Figure 3:
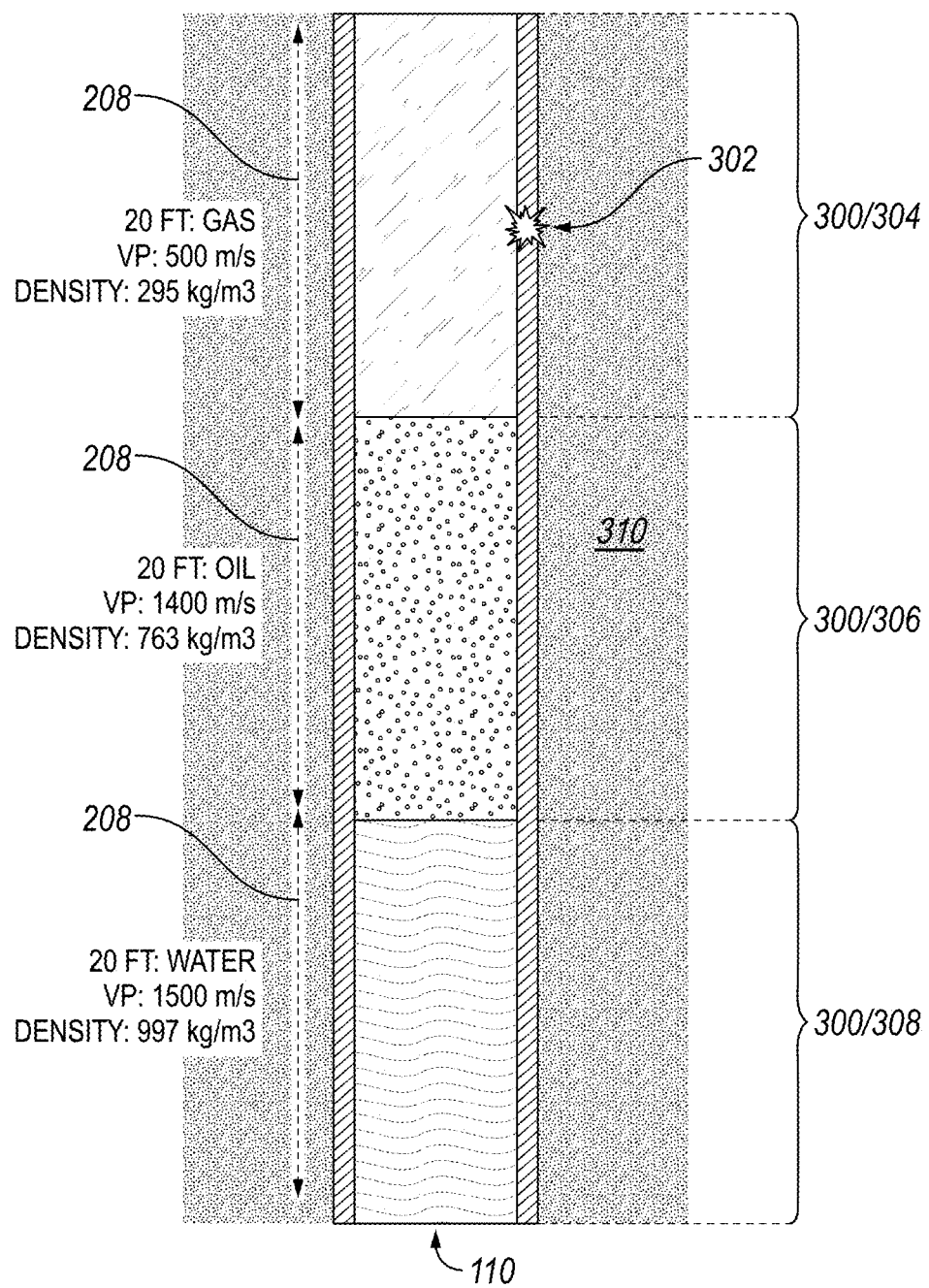
FIG. 3 illustrates a graphical representation of a first numerical simulation to simulate guided-wave noise propagation across three wellbore fluid zones.

FIG. 3 is a graphical representation of a first numerical simulation to simulate guided-wave noise 208 propagation across three wellbore fluid zones 300. For this example, a finite-difference method may be utilized in a cylindrical system to simulate the acoustic wave propagation in wellbore 110. As illustrated, acoustic source 302 is a monopole source that comprises Gaussian white noises between 0.1 and 1 kHz. The time length of the source is 100 ms. The location of acoustic source 302 is on first casing 134 and in the middle of gas zone 304. Both oil zone 306 and water zone 308 are disposed below gas zone 304. First casing 134 has an outer diameter of 4.5 inches and an inner diameter of 3.696 inches. The compressional velocity, shear velocity, and density for first casing 134, formation 310, and fluid in wellbore 110 are summarized in Table 1, seen below. Hydrophones 104 (e.g., referring to FIG. 2) are in the center of wellbore 110 with 4-inch vertical spacing.

TABLE 1

|  | Compressional Velocity (Vp)(m/s) | Shear Velocity (Vs)(m/s) | Density (kg/m³) |
| --- | --- | --- | --- |
| Formation | 2500 | 1250 | 1500 |
| Casing | 6000 | 3000 | 7878.5 |
| Gas | 500 | N.A. | 295 |
| Oil | 1400 | N.A. | 763 |
| Water | 1500 | N.A. | 997 |

Figure 4:
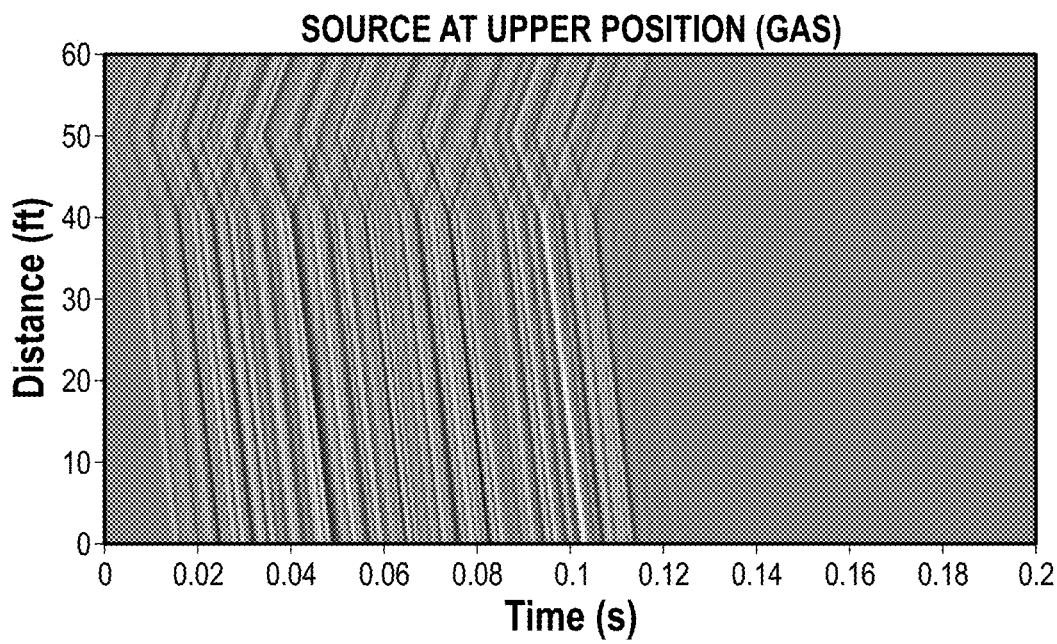
FIG. 4 is a graph illustrating waveforms captures from the first numerical simulation.
Figure 5:
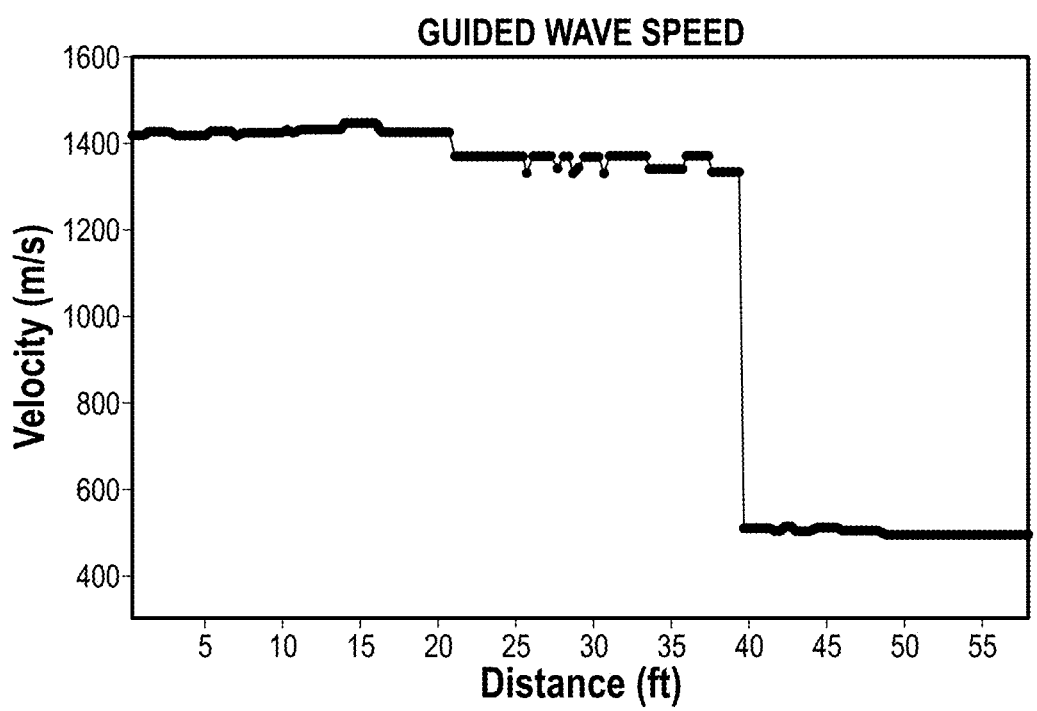
FIG. 5 is a graph of guided-wave speeds from the waveforms found in FIG. 4.

Simulated waveforms within the graphical representation of FIG. 3 are shown in FIG. 4. As graphed in FIG. 4, the acoustic source is at 50 ft (15 meters). Additionally, wave propagation upward and downward may be observed in the graph. FIG. 5 is a graph illustrating the measured speed of guided-wave noise 208 (e.g., referring to FIG. 2). As shown, water zone 304 is between 0-20 feet (0-6 meters), oil zone 306 is between 20-40 feet (6-12 meters), and gas zone 308 is between 40-60 feet (12-18 meters), which is shown in the graph. Each zone has a different speed for guided-wave noise 208. Thus, the wellbore fluid phase may be differentiated. As seen above in Table 1, the wavelength of guided-wave noise 208 is greater than the thickness of first casing 134 and radius of wellbore 110. Thus, the speed of guided-wave noise 208 (i.e., guided wave speed, seen below) may be estimated using the Stoneley-wave phase velocity in the low-frequency limit in isotropic media, which is mathematically shown as Equation (1).

$$V_{ST} = V_p / \sqrt{1 + K_f/\mu} \qquad (1)$$

In Equation (1) $V_{ST}$ is the Stoneley-wave phase velocity (which is also identified as guided wave speed), $V_p$ is the acoustic velocity of the wellbore fluid, $K_f$, is the wellbore fluid modulus ($K_f = \rho_f \cdot V_p^2$), $\rho_f$ is the wellbore fluid density, and $\mu$ is the shear modulus of the casing.

To validate Equation (1), a second numerical simulation is performed with a set of wellbore fluid acoustic velocities and densities. The configurations of the simulation are summarized in Table 2. The casing geometry and source properties are the same as sent above for the first numerical simulation.

|  | Compressional Velocity (Vp) (m/s) | Shear Velocity (Vs) (m/s) | Density (kg/m³) |
| --- | --- | --- | --- |
| Formation | 4500 | 2500 | 2500 |
| Casing | 5860 | 3130 | 7878.5 |
| Gas | 300, 350, 400, 450, 500, 550, 600, 650, 700 | N.A. | 200, 250, 300 |
| Liquid | 1000, 1100, 1200, 1250, 1300, 1350, 1400, 1450, 1500, 1550, 1600, 1700 | N.A. | 800, 900, 1000 |

Figure 6B:
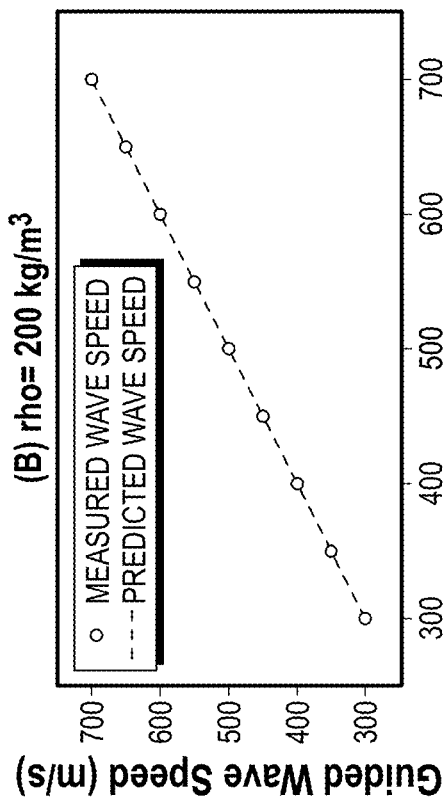
FIGS. 6A-6D are graphs showing a relationship between guided wave speed and acoustic velocity in a gas disposed in a wellbore.
Figure 6D:
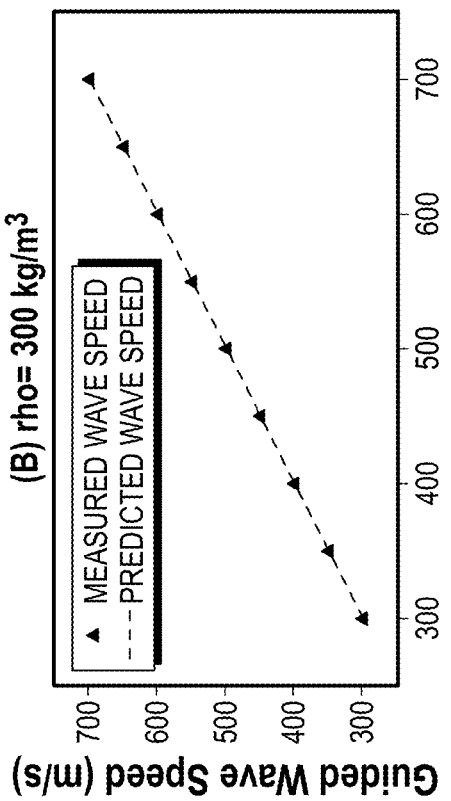
Figure 6A:
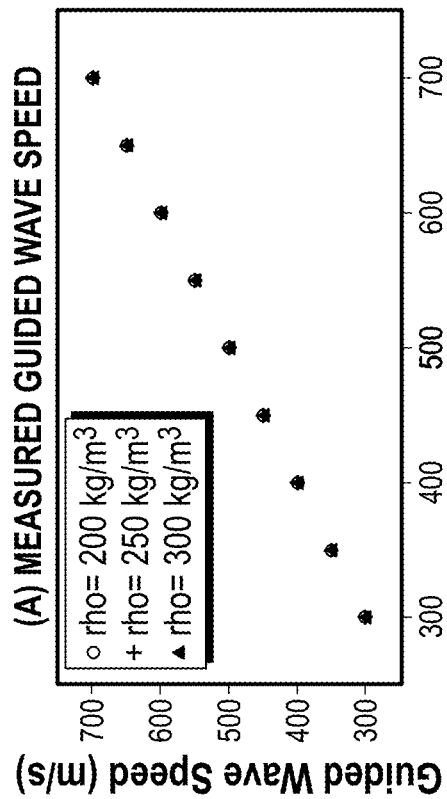
Figure 6C:
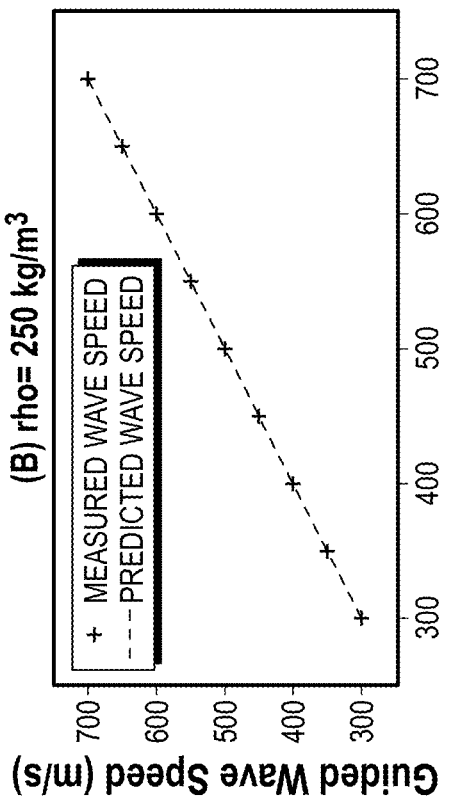
Figure 7B:
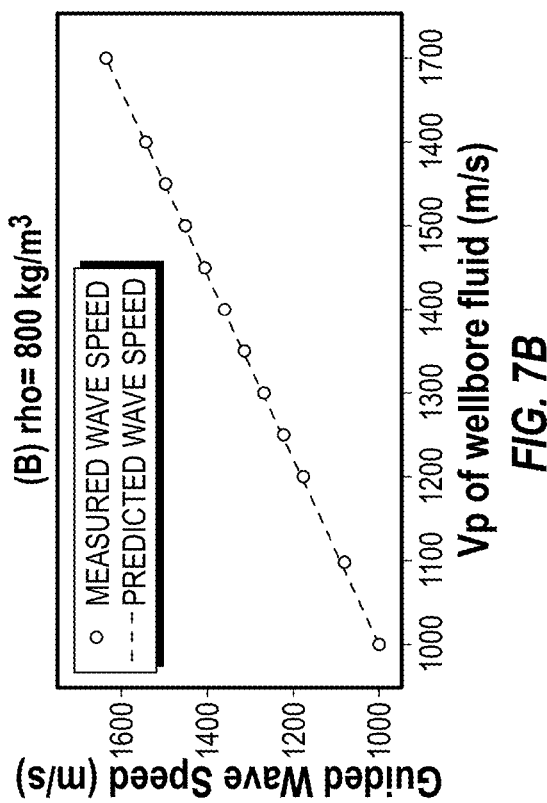
FIGS. 7A-7D are graphs showing a relationship between guided wave speed and acoustic velocity in a liquid disposed in a wellbore.
Figure 7D:
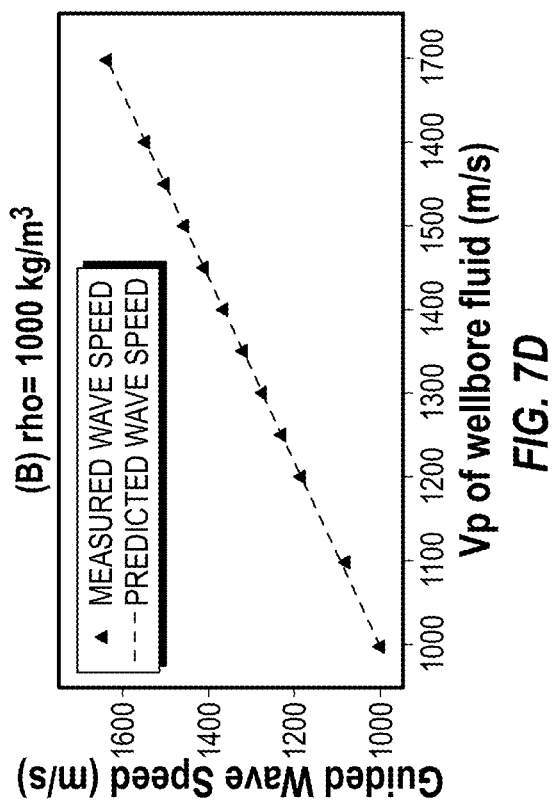
Figure 7A:
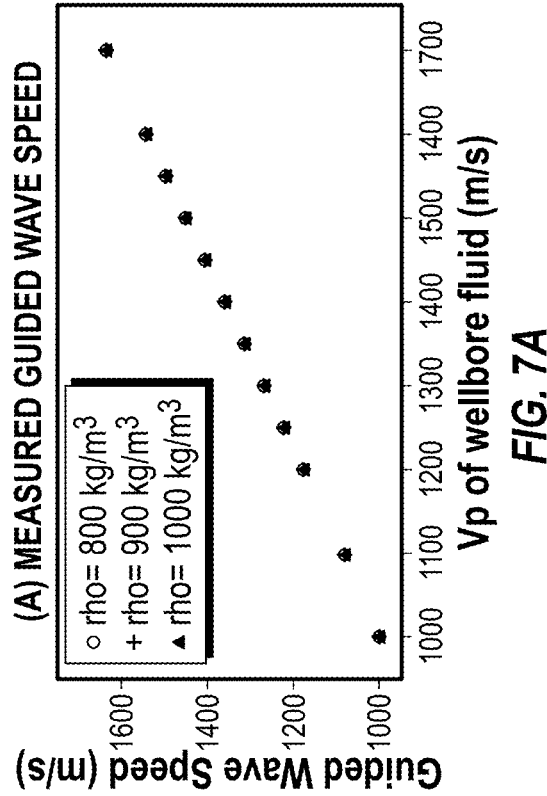
Figure 7C:
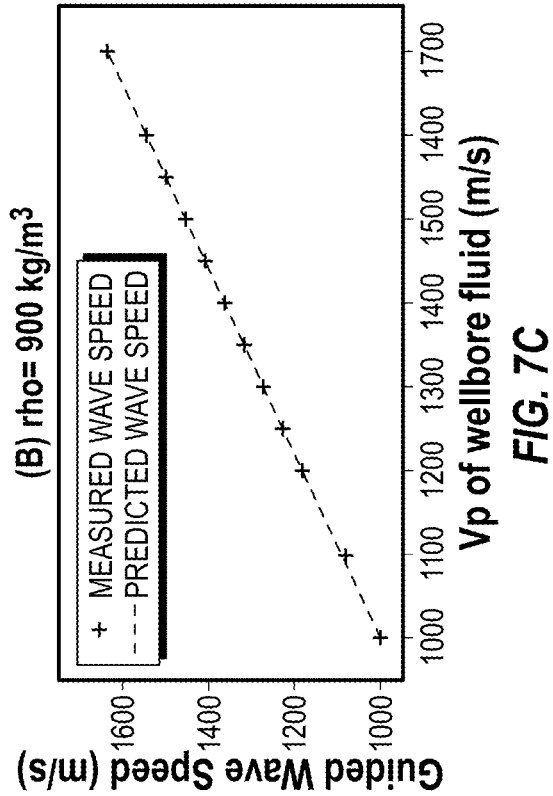

FIGS. 6A-6D are graphs that illustrate the guided wave speed vs. wellbore fluid acoustic velocity when the wellbore fluid phase is gas, as in gas zone 304 (e.g., referring to FIG. 3). The measurements with wellbore fluid density equal to 200 kg/m³ are plotted as dots, as illustrated in FIG. 6B. The measurements with a density equal to 250 kg/m³ are plotted as plus signs, as illustrated in FIG. 6C. The measurements with a density equal to 300 kg/m³ are plotted as triangles, as illustrated in FIG. 6D. The graphs illustrate, that the effects of the wellbore fluid density on guided wave speed may be ignored, because the dots, plus signs, and triangles overlapped each other when combined. FIGS. 6B, 6C, and 6D show the measured guided wave speed compared to the predicted guided wave speed from Equation (1) with wellbore fluid density equals 200 kg/m³, 250 kg/m³, and 300 kg/m³, respectively. The measured guided wave speeds are consistent with the predicted guided wave speeds, which proves Equation (1) may be utilized for gas zone 304.

FIGS. 7A-7D are the same as FIGS. 6A-6D but for the liquid phase, such as oil zone 306 and/or water zone 308, in wellbore 110. The measurements with wellbore fluid density equal to 800 kg/m³, 900 kg/m³, and 1000 kg/m³ are plotted as different dots in FIG. 7B, plus signs in FIG. 7C, and triangles in FIGS. 7C, respectively. The effects of the wellbore fluid density on the speed of guided-wave noise 208 are not significant, because the dots, plus signs, and triangles generally overlapped. The measured speeds of guided-wave noise 208 are comparable to the predicted speeds of guided-wave noise 208, which proves that Equation (1) may be utilized for a liquid, such as oil zone 306 and/or water zone 308. Using Equation (1), measurement data may be utilized for establishing a database for speeds of guided-wave noise 208 and corresponding wellbore fluid acoustic velocities. FIGS. 6A-6D and 7A-7D show guided wave speeds at 0.1-1 kHz, but computational simulations may be performed at other frequencies, which may be added to the database. The database may be further populated with speeds of guided-wave noise 208 at multiple frequencies. Thus, wellbore fluid acoustic velocity may be estimated using a pre-computed database.

Figure 8:
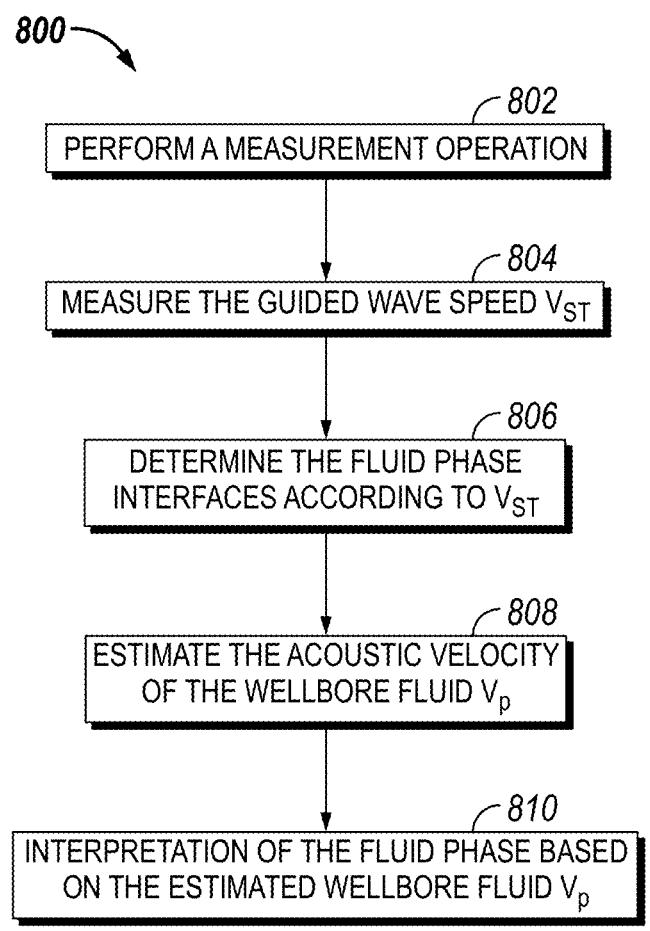
FIG. 8 is a workflow for measuring the speed of guided-wave noise using an acoustic logging tool.

FIG. 8 illustrates workflow 800 for measuring the speed of guided-wave noise 208 (e.g., referring to FIG. 2) using an acoustic logging tool 100 (e.g., referring to FIG. 1). This may allow for the estimation of acoustic velocity of the wellbore fluid and identifying the fluid phase. Workflow 800 may begin with block 802. To perform the measurement operation acoustic logging tool 100 is disposed within wellbore 110 (e.g., referring to FIG. 1). During the measurement operation, two or more hydrophones 104 capture and/or record acoustic noise data at one or more depths within wellbore 110 that may comprise guided waves. The measurements taken in block 802 may form a data set which is sent to an information handling system 144 (e.g., referring to FIG. 1) that is communicatively connected to acoustic logging tool 100. In examples, information handling system 144 may be disposed on acoustic logging tool 100 and/or may communicate with another information handling system 144 that may be disposed at the surface. In block 804, the data set may be processed by information handling system 144 to determine a guided wave speed $V_{ST}$, as discussed above using Equation (1). For example, at any acquisition depth, the captured waveforms (i.e., the data set) from multiple hydrophones are stacked within a range of slowness to find the optimized slowness. The optimized slowness is determined when stacked waveform yields the highest amplitude. The guided wave speed is calculated as 1 divided by the slowness.

In block 806, one or more fluid phase interfaces are graphed utilizing $V_{ST}$, such as seen in FIGS. 6A-6D, using information handling system 144. The measured and processed $V_{ST}$ from block 804 is graphed as a curve over the depth of measurements. Over depth, the fluid phase interface may change, for example, from oil to water, water to gas, oil to gas, and/or any combinations thereof. The fluid phase interface is identified when a rapid change in the $V_{ST}$ curve is seen in the overall graph for the entire measurement operation. Thus, the phase interfaces may be preliminary determined by the differentiation of the guided wave speed $V_{ST}$ and conditions of wellbore 110.

In block 808, the wellbore fluid acoustic velocity $V_p$ may be estimated using information handling system 144, which may estimate the acoustic velocity of wellbore fluid using Equation (1), or using a pre-computed database, as discussed above. The pre-computed database is a look-up table to find a $V_p$ for any given $V_{ST}$. The database is computed using Equation (1) given general wellbore fluid modulus and casing shear modulus. An estimated fluid density $\rho_f$ may be used to estimate the wellbore fluid acoustic velocity $V_p$. In examples, the fluid density may be estimated using the composition of the fluid that the well produces and the pressure and temperature of the downhole environment. Thus, fluid density may be estimated empirically based on well conditions and $V_{ST}$. Generally, the fluid density does not significantly affect the relationship between guided wave speed $V_{ST}$ and wellbore fluid acoustic velocity $V_p$ according, as discussed above.

In block 810, an interpretation of the fluid phases is performed based at least in part on the identified wellbore fluid acoustic velocity $V_p$ from block 808. The phase interpretation may be performed by information handling system 144, which may compare the estimated acoustic velocity $V_p$ in block 808 with reference acoustic velocity ranges of gas, oil, and water from a populated database. The reference ranges may be determined based on conditions of wellbore 110. For example, a production well that produces water and gas, the range of acoustic velocity in gas may be 300-700 m/s and the range of acoustic velocity in water may be 1400-1600 m/s. In other examples, blocks 808 and 810 may be replaced by an approximate interpretation of the fluid phases-based measure guided wave speed $V_{ST}$ using information handling system 144. This is due to guided wave speed $V_{ST}$ being generally close to the wellbore fluid acoustic velocity $V_p$. Therefore, the fluid phases may be based on a production well that produces water and gas, the range of guided wave speed in gas may be 300-700 m/s and the range of guided wave speed in water may be 1400-1600 m/s. The phase interpretation may be done by comparing the $V_{ST}$ with reference Stoneley-wave speed ranges of gas, oil, and water. The reference ranges may be determined based on conditions of wellbore 110.

The knowledge of fluid phases may help with temperature modeling to better quantify a flow profile. The information of the acoustic velocity of the wellbore fluid may also help with localization of leaks, channel flows, and formation flows. Improvements over current technology are found in the methods and systems that allow for an acoustic logging tool to identify wellbore fluid phase or estimate the acoustic velocity of the wellbore fluid.

The systems and methods may include any of the various features disclosed herein, including one or more of the following statements.

Statement 1: A method for identifying guided waves in a measurement set may comprise disposing an acoustic logging tool into a wellbore, taking one or more measurements with the acoustic logging tool in the wellbore to form a data set which comprises one or more guided waves, and identify a speed of the one or more guided waves from the data set. The method may further comprise identifying a fluid phase interface using the speed of the one or more guided waves, estimating an acoustic velocity of a wellbore fluid using a database, and interpreting the fluid phase based at least in part on the acoustic velocity of the wellbore fluid.

Statement 2: The method of statement 1, wherein the acoustic velocity is estimated using $V_{ST}=V_p/\sqrt{1+K_f/\mu}$, where $V_{ST}$ is the Stoneley-wave phase velocity, $V_p$ is the acoustic velocity of the wellbore fluid, $K_f$, is the wellbore fluid modulus ($K_f=\rho_f \cdot V_p^2$), $\rho_f$ is the wellbore fluid density, and $\mu$ is the shear modulus of the casing.

Statement 3: The method of statements 1 or 2, wherein the acoustic velocity is estimated using a pre-computed database.

Statement 4: The method of statement 3, wherein the pre-computed database is populated from a plurality of measurements from a plurality of previously measurements from one or more previous wellbores.

Statement 5: The method of statements 1, 2, or 3, further comprising estimating wellbore fluid acoustic velocity using fluid density.

Statement 6: The method of statement 5, further comprising estimating fluid density empirically based at least in part on well condition and a Stoneley-wave phase velocity.

Statement 7: The method of statement 6, wherein the wellbore fluid is a gas, an oil, or a water.

Statement 8: The method of statements 1, 2, 3 or 5, further comprising performing an approximate interpretation to replace the estimating the acoustic velocity of the wellbore fluid using the database and the interpreting the fluid phase based at least in part on the acoustic velocity of the wellbore fluid.

Statement 9: The method of statement 8, wherein the approximate interpretation compares a Stoneley-wave phase velocity to a Stoneley-wave speed range of the wellbore fluid.

Statement 10: The method of statement 9, wherein the wellbore fluid is a gas, an oil, or a water.

Statement 11: A system comprising: an acoustic logging tool comprising a hydrophone array disposed on the acoustic logging tool, wherein the hydrophone array is configured to take one or more measurements. The system may further comprise an information handling system configured to form a data set from the one or more measurements, identify a speed of one or more guided waves based at least in part on the data set, identify a fluid phase interface using the speed of the one or more guided waves; estimate an acoustic velocity of a wellbore fluid using a database, and interpret the fluid phase based at least in part on the acoustic velocity of the wellbore fluid.

Statement 12: The system of statement 11, wherein the acoustic velocity is estimated using $V_{ST}=V_p/\sqrt{1+K_f/\mu}$, where $V_{ST}$ is the Stoneley-wave phase velocity, $V_p$ is the acoustic velocity of the wellbore fluid, $K_f$ is the wellbore fluid modulus ($K_f=\rho_f \cdot V_p^2$), $\rho_f$ is the wellbore fluid density, and $\mu$ is the shear modulus of the casing.

Statement 13: The system of statements 11 or 12, wherein the acoustic velocity is estimated using a pre-computed database.

Statement 14: The system of statement 13, wherein the pre-computed database is populated from a plurality of measurements from a plurality of previously measurements from one or more previous wellbores.

Statement 15: The system of statements 11, 12, or 13, wherein the information handling system is further configured to estimate wellbore fluid acoustic velocity using fluid density.

Statement 16: The system of statement 15, wherein the information handling system is further configured to estimate fluid density empirically based at least in part on well condition and a Stoneley-wave phase velocity.

Statement 17: The system of statement 16, wherein the wellbore fluid is a gas, an oil, or a water.

Statement 18: The system of statements 11, 12, 13, or 15, wherein the information handling system is further configured to perform an approximate interpretation to replace the estimating the acoustic velocity of the wellbore fluid using the database and the interpreting the fluid phase based at least in part on the acoustic velocity of the wellbore fluid.

Statement 19: The system of statement 18, wherein the approximate interpretation compares a Stoneley-wave phase velocity to a Stoneley-wave speed range of the wellbore fluid.

Statement 20: The system of statement 19, wherein the wellbore fluid is a gas, an oil, or a water.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying guided waves in a measurement set, comprising:
    disposing an acoustic logging tool into a wellbore;
    taking one or more measurements with the acoustic logging tool in the wellbore to form a data set which comprises one or more guided waves;
    identify a speed of the one or more guided waves from the data set;
    identifying a fluid phase interface using the speed of the one or more guided waves;
    estimating an acoustic velocity of a wellbore fluid using a database based on at least the speed of one or more guided waves; and
    interpreting the fluid phase based at least in part on the acoustic velocity of the wellbore fluid.

2. The method of claim 1, estimating an acoustic velocity of a wellbore fluid using a database further comprising $V_p=(\sqrt{1+K_f/\mu})V_{ST}$, where $V_p$ is the acoustic velocity of the wellbore fluid, $V_{ST}$ is the speed of the one or more guided waves, $V_p$, $K_f$ is the wellbore fluid modulus ($K_f=\rho_f V_p^2$), $\rho_f$ is the wellbore fluid density, and $\mu$ is the shear modulus of the casing.

3. The method of claim 1, wherein the acoustic velocity is estimated using a pre-computed database.

4. The method of claim 3, wherein the pre-computed database is populated from a plurality of measurements from a plurality of previous measurements from one or more previous wellbores.

5. The method of claim 1, wherein estimating an acoustic velocity of a wellbore fluid using a database further comprises utilizing fluid density.

6. The method of claim 5, further comprising estimating fluid density empirically based at least in part on well condition and the speed of the one or more guided waves.

7. The method of claim 6, wherein the wellbore fluid is a gas, an oil, or a water.

8. A method for identifying guided waves in a measurement set, comprising:
   disposing an acoustic logging tool into a wellbore;
   taking one or more measurements with the acoustic logging tool in the wellbore to form a data set which comprises one or more guided waves;
   identify a speed of the one or more guided waves from the data set;
   identifying a fluid phase interface using the speed of the one or more guided waves; and
   performing an approximate interpretation of the fluid phase using a database.

9. The method of claim 8, wherein the approximate interpretation compares a Stoneley-wave phase velocity to a Stoneley-wave speed range of the wellbore fluid.

10. The method of claim 9, wherein the wellbore fluid is a gas, an oil, or a water.

* * * * *